United States Patent

[11] 3,549,863

[72] Inventor Wilson P. Ralston
 Stamford, Conn.
[21] Appl. No. 694,320
[22] Filed Dec. 28, 1967
[45] Patented Dec. 22, 1970
[73] Assignee The Perkin-Elmer Corporation
 Norwalk, Conn.
 a corporation of New York

[54] TEMPERATURE CONTROL ARRANGEMENT
 6 Claims, 3 Drawing Figs.
[52] U.S. Cl. .................................................. 219/494
[51] Int. Cl. .................................................. H05b 1/02
[50] Field of Search .................................................. 219/497,
 499, 483, 494; 307/11, 31

[56] References Cited
 UNITED STATES PATENTS
2,724,040 11/1955 Mouzon ........................ 219/497
3,371,191 2/1968 Seney .......................... 219/511
3,431,399 3/1969 Venning ....................... 269/497

Primary Examiner—Bernard A. Gilheany
Assistant Examiner—F. E. Bell
Attorney—Edward R. Hyde, Jr.

ABSTRACT: A proportional control thermostating circuit arrangement for establishing and maintaining independent set-point temperatures at a plurality of stations includes a heater and a temperature sensing element located at each of $n$ stations. Circuit means including the plurality of temperature sensing elements provide $n$, periodically-recurring, phase-differing electrical indications having a characteristic thereof representative of the deviation of an associated station temperature from the desired set-point temperature. Circuit means periodically apply heating current to each of said $n$ heating elements in phase synchronization with the occurrence of the associated electrical indication and in accordance with the electrical characteristic thereof for maintaining the desired station set-point temperature.

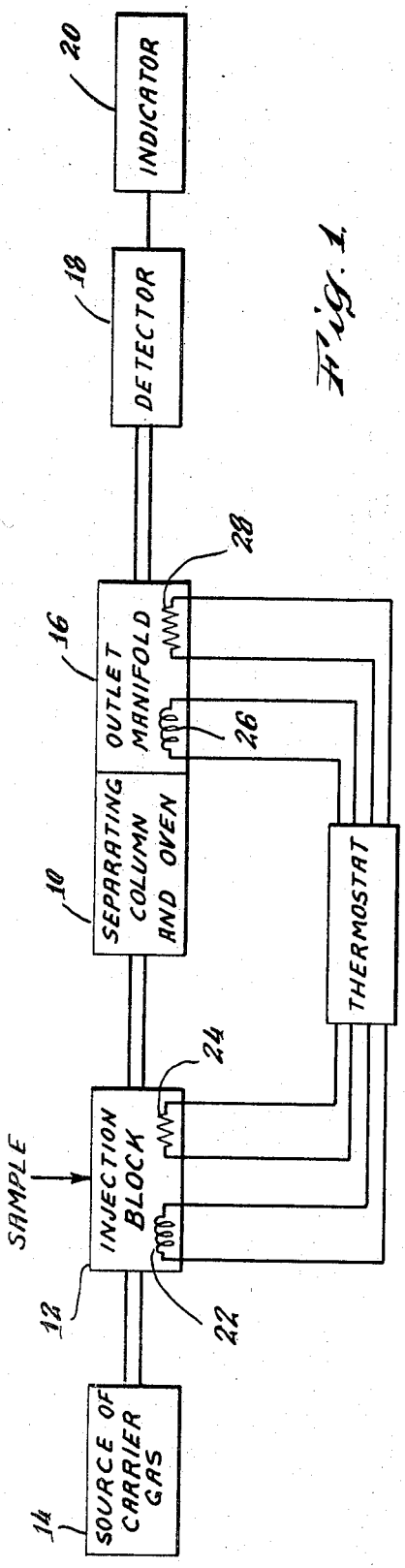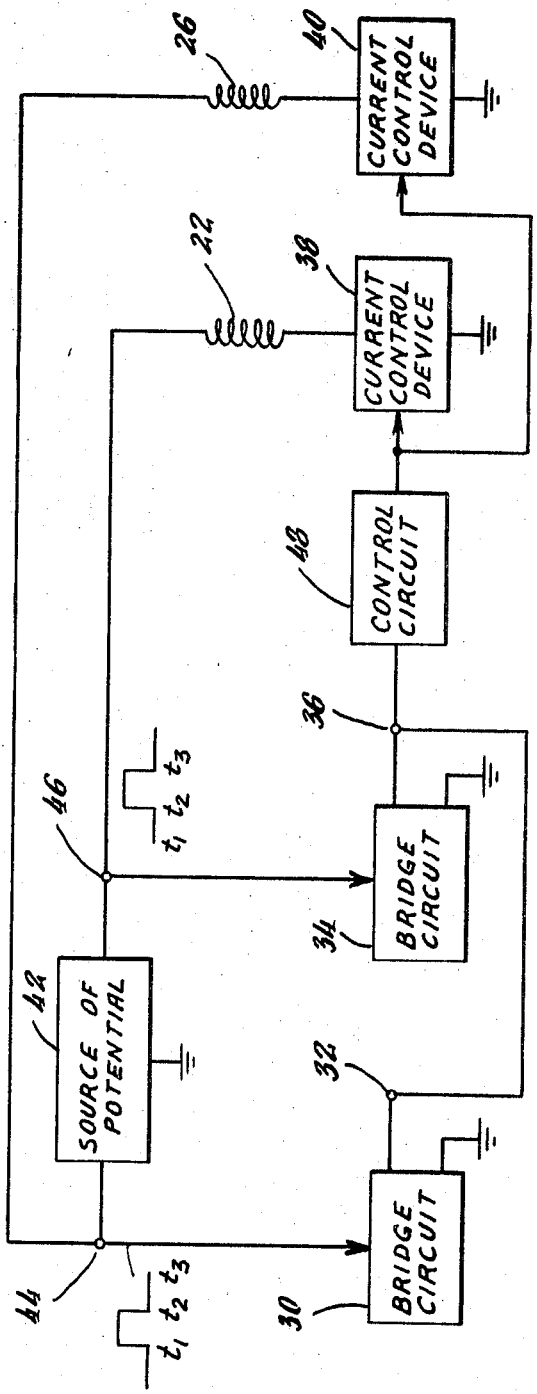

INVENTOR.
WILSON P. RALSTON

TEMPERATURE CONTROL ARRANGEMENT

This invention relates to temperature control arrangements. The invention relates more particularly to an improved thermostating circuit arrangement.

It is desirable at times to thermostatically control the temperature at two or more stations in an apparatus such as an analytical instrument. In a particular analytical instrument application, it has been found that the set-point temperature of an electrically heated injection block and column outlet manifold block of a gas chromatograph are subject to variations which accompany random variations in line voltage amplitude. In addition, the injection block and manifold block temperatures are subject to variations in ambient temperature and, because of thermal coupling, are subject to variations in column oven temperature. The injector and manifold block temperature variations disadvantageously result in electrical noise at a detector of the chromatograph and interfere with sample analyses. It is therefore desirable to provide proportional temperature control at each of these locations in order to establish and maintain the temperature thereof with a relatively high degree of accuracy. As is well known, a proportional temperature control system senses station temperature and applies electrical heating energy in accordance with deviations from a set-point temperature in order to maintain the desired set-point temperature.

In a known proportional control arrangement, a current control device is coupled to an electrical heating element and periodically applies heating energy to the element in accordance with temperature deviations from the set-point temperature. This latter deviation is determined by a temperature sensing element such as a thermistor or a platinum sensor positioned at the station and coupled in a bridge circuit arrangement along with means adapted for establishing the set-point temperature. Although this arrangement provides satisfactory proportional temperature control for a single station, the duplication of a similar arrangement for the temperature control of a second station becomes relatively expensive.

Accordingly, it is an object of this invention to provide an improved thermostating circuit arrangement.

Another object of the invention is to provide an improved two-station thermostating circuit arrangement.

Another object of the invention is to provide a proportional control two-station thermostating arrangement.

A further object of the invention is to provide a two-station proportional control thermostating arrangement requiring relatively few components and of relatively less cost than two separate proportional thermostat arrangements.

In accordance with the present invention a proportional control thermostating circuit arrangement for establishing and maintaining independent set-point temperatures at a plurality of stations includes a heater and a temperature sensing element located at each of n stations. Circuit means including the plurality of temperature sensing elements provide n, periodically-recurring, phase-differing electrical indications having a characteristic thereof representative of the deviation of an associated station temperature from the desired set-point temperature. Circuit means periodically apply heating current to each of said n heating elements in phase synchronization with the occurrence of the associated electrical indication and in accordance with the electrical characteristic thereof for maintaining the desired station set-point temperature.

These and other objects and features of the present invention will become apparent with reference to the following specification and drawings, wherein:

FIG. 1 is a block diagram of an analytical instrument incorporating an embodiment of the present invention;

FIG. 2 is a block diagram of a thermostatic circuit arrangement constructed in accordance with features of this invention;

Figure 3:
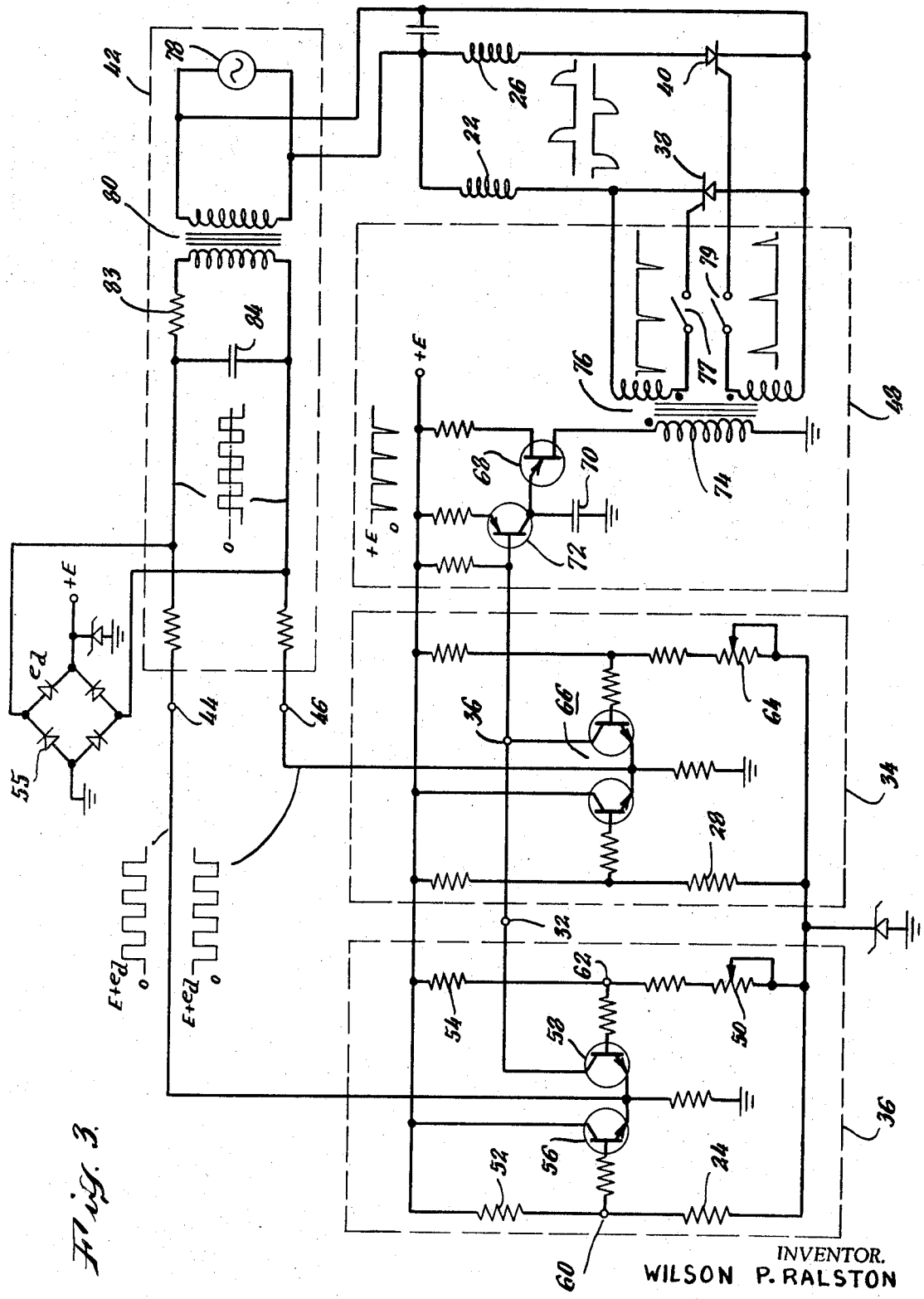
FIG. 3 is a schematic circuit diagram illustrating in greater detail one embodiment of the thermostating circuit arrangement of the present invention.

Referring now to FIG. 1, an analytical instrument comprising a gas chromatograph employing a two-station proportional temperature control will be briefly described. The chromatograph includes a separating column and oven 10 for separating a sample under analysis into constituents. The sample is introduced at a heated injection block 12 and is conveyed by a carrier gas, derived from a source 14, to the separating column. The separated constituents elute successively in time from the column 10 at a heated outlet manifold 16 from which they are conveyed by the carrier gas to a conventional detector 18. An indicator 20 such as a chart recorder is provided for displaying a record of the effluents of the column.

In order to provide a sample in vaporized form and in order to maintain the separated constituents in vaporized form prior to detection, the injection block 12 and the outlet manifold block 16 are electronically heated. In view of the effect on the detector output when a deviations occur in the temperature of these blocks from a desired set-point temperature, it is desirable to provide proportional thermostat control. A first resistive electrical heating element 22 and a first temperature sensing element 24 are positioned at the injection block and a second resistive electrical heating element 26 and a second temperature sensing element 28 are positioned at the outlet manifold block 16.

In FIG. 2, a circuit arrangement in accordance with the present invention provides proportional temperature control at both the injection block station 12 and outlet manifold block station 16. Circuit means comprising a bridge circuit arrangement including the platinum resistance temperature sensing element 24 and a means for establishing a set-point temperature are provided. These circuits means, indicated generally by the block 30 and described in greater detail hereinafter, include an output terminal 32 at which a voltage having an amplitude representative of the deviation of injection block temperature from a desired set-point temperature is established. Similarly, circuit means comprising the bridge circuit arrangement 34 including the temperature sensing element 28 and a means for establishing a set-point temperature for the outlet manifold block 16 are provided. These circuit means also include an output terminal 36 at which a voltage having an amplitude representative of the deviation in the temperature of the block 16 from the desired set-point temperature is established. A first heating current control device 38 having a control element for controlling the average current flowing therein is coupled in series with the injection block heater element 22. A second current control device 40 also having a current control element is coupled in series with the outlet manifold block heating element 26. Operating potential for these current control devices is provided by a source 42 and is applied to the current control device through the associated heating element. The source of operating potential 42 provides periodic phase differing output potentials at its terminals 44 and 46 respectively. The current control devices are thereby energized by periodically recurring phase differing operating potentials.

Output voltages at the terminals 32 and 36 which are representative of the temperature deviations are applied to the control elements of the current control devices through a control circuit 48. Through this arrangement, the average power controlled by devices 38 and 40 is proportional to the amplitude of the voltages at terminals 46 and 44 respectively. A circuit enabling potential in phase synchronism with the output potential from the source 42 is coupled to each of the circuit means 30 and 34 for providing that a one of these circuit means provides an output voltage when an associated current control device is simultaneously enabled. FIG. 2 illustrates the enabling voltages derived from the source of operating potential 42. The thermostating circuit arrangement is thereby multiplexed and advantageously eliminates the need for duplication of circuit elements when separate thermostatic arrangements are provided.

FIG. 3 illustrates a detailed schematic diagram of a particular embodiment of the invention. Circuit elements in FIG. 3 which perform similar functions as those described in FIG. 2 bear the same reference numerals. In this arrangement, the line voltage functions as the source of operating potential and phase differing energization and enabling is effected by the use of properly polarized circuit elements. Each of the bridge circuits 30 and 34 are indicated by those circuit elements enclosed within dashed-line rectangles. The bridge circuit 30 includes an arm formed by the resistance of the injection block thermistor temperature sensing element 24, an arm formed by a potentiometer 50 which is manually or automatically adjustable such as in a temperature programmed operation for selecting a desired set-point temperature, and third and fourth arms formed by resistive impedances 52 and 54 respectively. A DC potential +E, derived from a rectifier circuit 55 is applied to the bridge circuit between impedances 52 and 54 and ground for establishing a current flow in this bridge circuit. A differential amplifier including transistors 56 and 58 is coupled between junction points 60 and 62 of the bridge and provides at an output terminal 32, a voltage having an amplitude representative of the deviation between the injection block set-point temperature and its actual temperature as indicated by sensing element 24. As described in greater detail hereinafter, the differential amplifier is periodically disabled by the application of a positive potential at the emitter electrodes. The second bridge circuit 34 is arranged in a similar manner and provides at an output terminal 36 a voltage representative of the deviation in temperature between the outlet manifold set-point temperature as established by a potentiometer 64 and the actual temperature as indicated by the sensing element 28. A differential amplifier 66 of this bridge circuit is periodically disabled by the application of a positive potential to the emitter electrodes. Since line voltage is utilized as a source of enabling voltage, the differential amplifiers of bridge circuits 30 and 34 are alternately disabled during a cycle at line frequency.

The heating elements 22 and 26 are coupled in series with current control devices comprising a silicon controlled rectifier 38 and a silicon controlled rectifier 40 respectively. As shown in FIG. 3, these SCR's are oppositely poled and are coupled across the AC line. The current control devices are thereby adapted to conduct current on a half-wave basis during alternate half cycles of the AC line voltage and when a firing potential is simultaneously applied to the gate electrode. As is well known, that instant during the enabling half cycle when firing occurs will determine the average heating current flowing through the devices 38 and 40.

A phase coincident potential indicative of the instant during an enabling half cycle when the SCR's 38 and 40 are to be fired is derived from the bridge circuits 34 and 30 respectively. The disabling potentials applied to the differential amplifiers of the bridge circuits 30 and 34 are 180° out of phase and the output voltages at terminals 32 and 36 will therefore exhibit temperature error information on alternate half cycles of line frequency. For example, when a negative potential derived from terminal 44 of source 42 occurs at the emitter electrodes of the differential amplifier of bridge circuit 30, a negative potential is simultaneously applied to the cathode electrode of the SCR 38. A DC voltage at terminal 32 is applied to the control circuit 48 for controlling the firing angle of SCR 38. The control circuit 48 includes a unijunction transistor 68, a charging capacitor 70, and a PNP transistor 72 which is adapted for controlling the charging rate of the capacitor 70 in accordance with the base current applied thereto. The charging of capacitor 70 is controlled in accordance with the DC voltage amplitude at terminals 32 and 36. As the trigger level of the unijunction transistor is attained, the capacitor discharges through its base circuit and a pulse is generated at the primary 74 of a transformer 76. A corresponding pulse on the secondary windings is simultaneously applied to the SCR's 38 and 40, through switches 77 and 79. Because of the polarized circuit arrangement, only that SCR associated with the enabled bridge circuit is fired.

The source of operating potential 42 is shown to comprise a line voltage represented by the AC generator 78 along with a voltage transformer 80. The appropriately poled voltages for enabling and disabling the bridge circuits occur at output terminals 44 and 46. A bridge rectifier circuit 82 is also coupled across the secondary of the transformer 80 and provides an operating potential +E for the thermostating circuit arrangement. Resistor 83 is provided for voltage dropping while capacitor 84 functions as a transient suppressor.

Although a two-station proportional control thermostating arrangement has been described and has derived the desired operating potential and bridge circuit enabling and disabling voltages from a line source of voltage, it will be understood that $n$ such stations may be thermostatically controlled by providing $n$ bridge circuit arrangements and by providing an $n$ phase source of operating potential 42.

A proportional control thermostating circuit arrangement for controlling independent set-point temperatures at a plurality of stations has thus been described. Duplication of circuit components is advantageously reduced to provide a relatively inexpensive thermostating arrangement.

While I have illustrated and described a particular embodiment of my invention, it will be understood that various modifications may be made therein without departing from the spirit of the invention and the scope of the appended claims.

I claim:

1. A proportional control thermostat circuit arrangement for maintaining independent set-point temperatures at a plurality of stations comprising:
   a plurality of $n$ electrical heater and $n$ temperature sensing elements;
   a one of said heating elements and an associated one of said sensing elements positioned at each of $n$ stations;
   circuit means including said plurality of temperature sensing elements providing $n$ periodically recurring phase differing electrical indications each having a characteristic thereof proportional to a temperature deviation between an associated station temperature and a set-point temperature; and
   circuit means periodically applying heating current to each of said $n$ heating elements in phase synchronization with the occurrence of an associated electrical indication and in accordance with the characteristic thereof for providing an average heater element power proportional to a difference between station temperature and set-point temperature.

2. A proportional control thermostat circuit arrangement for controlling set-point temperatures at first and second stations comprising:
   a first electrical heater element and a first temperature sensing element positioned at the first station;
   a second electrical heater element and a second temperature sensing element positioned at the second station;
   circuit means including said first and second temperature sensing elements alternately providing an electrical indication having a characteristic thereof proportional to a temperature deviation between station temperature and set-point temperature; and
   circuit means alternately applying heating current to said heater elements in phase synchronization with the occurrence of an associated electrical indication and in accordance with the characteristic thereof for providing an average heater element power proportional to a difference between station temperature and set-point temperature.

3. A thermostat for controlling set-point temperatures at first and second stations comprising:
   a first heater element and a first temperature sensing element positioned at the first station;
   a second heater element and a second temperature sensing element positioned at the second station;
   a first current control device having a control electrode thereof;

means intercoupling said first device and heater element in a manner for applying a heating current to said element when an operating potential is applied thereto;

means intercoupling said second device and heater element in a manner for applying a heating current to said element when an operating potential is applied thereto;

first circuit means including said first temperature sensing element adapted for providing at an output terminal thereof a voltage having an amplitude indicative of the deviation in temperature of said first station from a set-point temperature;

second circuit means including said second temperature sensing element adapted for providing at an output terminal thereof a voltage having an amplitude indicative of the deviation in temperature of said second station from a set-point temperature;

means coupling said voltages at said output terminals to the control electrodes of said first and second current control devices for controlling the average current flow in said devices; and means for applying a disabling potential to said first and second circuit means in a manner for causing said voltages to alternately appear at said first and second terminals and for simultaneously and alternately applying operating potential to said first and second current control devices.

4. The thermostat of claim 3, wherein said current control devices comprise silicon control rectifiers coupled in series with said first and second heater elements.

5. The thermostat of claim 4, wherein said first and second circuit means comprise bridge circuit arrangements.

6. The thermostat of claim 5, wherein said bridge circuit elements each include an amplifying device which is alternatively enabled and disabled.